(12) United States Patent
Howe et al.

(10) Patent No.: US 7,370,318 B1
(45) Date of Patent: May 6, 2008

(54) SYSTEM AND METHODOLOGY FOR ASYNCHRONOUS CODE REFACTORING WITH SYMBOL INJECTION

(75) Inventors: Mark K. Howe, Capitola, CA (US); Lubomir B. Litchev, San Carlos, CA (US); Christian K. Kemper, Santa Cruz, CA (US)

(73) Assignee: Borland Software Corporation, Austin, TX (US)

( * ) Notice: Subject to any disclaimer, the term of this patent is extended or adjusted under 35 U.S.C. 154(b) by 665 days.

(21) Appl. No.: 10/711,230

(22) Filed: Sep. 2, 2004

(51) Int. Cl.
*G06F 9/44* (2006.01)

(52) U.S. Cl. .................. 717/110; 717/111; 717/112; 717/113

(58) Field of Classification Search ............... 717/110, 717/111, 112, 113
See application file for complete search history.

(56) References Cited

U.S. PATENT DOCUMENTS

| | | | | |
|---|---|---|---|---|
| 5,583,983 | A * | 12/1996 | Schmitter | 717/138 |
| 5,671,415 | A * | 9/1997 | Hossain | 717/101 |
| 5,754,858 | A * | 5/1998 | Broman et al. | 717/111 |
| 5,870,753 | A * | 2/1999 | Chang et al. | 707/103 R |
| 5,881,230 | A | 3/1999 | Christensen et al. | 709/203 |
| 5,946,486 | A * | 8/1999 | Pekowski | 717/128 |
| 6,026,238 | A * | 2/2000 | Bond et al. | 717/141 |
| 6,662,359 | B1 | 12/2003 | Berry et al. | 717/130 |
| 6,704,926 | B1 | 3/2004 | Blandy et al. | 717/148 |
| 6,704,927 | B1 * | 3/2004 | Bak et al. | 717/151 |
| 6,804,682 | B1 * | 10/2004 | Kemper et al. | 717/120 |
| 6,804,686 | B1 | 10/2004 | Stone et al. | 707/104.1 |
| 6,807,548 | B1 | 10/2004 | Kemper | 707/103 |
| 6,851,105 | B1 | 2/2005 | Coad et al. | 717/106 |
| 6,904,590 | B2 | 6/2005 | Ball et al. | 717/132 |
| 6,973,646 | B1 | 12/2005 | Bordawekar et al. | 717/146 |
| 7,076,762 | B2 * | 7/2006 | Fisher | 717/102 |
| 7,076,764 | B2 * | 7/2006 | Kramer | 717/120 |
| 7,168,062 | B1 * | 1/2007 | Schmitter | 717/113 |
| 7,237,236 | B2 * | 6/2007 | Kershenbaum et al. | 717/154 |
| 2004/0261057 | A1 * | 12/2004 | Shinomi | 717/114 |

OTHER PUBLICATIONS

Li, et al. "Tool Support for Refactoring Functional Programs", Aug. 28, 2003, ACM, p. 27-38.*

(Continued)

*Primary Examiner*—Eric B. Kiss
*Assistant Examiner*—Qamrun Nahar
(74) *Attorney, Agent, or Firm*—John A. Smart; G. Mack Riddle

(57) ABSTRACT

A system and methodology for asynchronous code refactoring with symbol injection is described. In one embodiment, for example, a method is described for refactoring a plurality of interdependent software modules that reside in separate projects, the method comprises steps of: in response to a change that affects a particular symbol of a software module that resides in a first project, refactoring the software module of the first project to propagate the change to all instances of the particular symbol in the software module; during the refactoring of the software module of the first project, recording meta data about the refactoring that is required to effect the change; and automatically propagating the change to a dependent software module residing in a second project, by refactoring the dependent software module based on the recorded meta data about the refactoring that occurred to the software module of the first project.

55 Claims, 8 Drawing Sheets

OTHER PUBLICATIONS

K. Maruyama, "Automated Method-Extraction Refactoring by Using Block-Based Slicing", 2001, ACM, p. 31-40.*

Counsell, et al. "Trends in Java code changes: the key to identification of refactorings?" 2003, PPPJ, p. 1-4.*

Garrido, et al. "Challenges of Refactoring C programs", 2002, ACM, p. 6-14.*

* cited by examiner

FIG. 5B

SYSTEM AND METHODOLOGY FOR ASYNCHRONOUS CODE REFACTORING WITH SYMBOL INJECTION

CROSS REFERENCE TO RELATED APPLICATIONS

The present application is related to the following commonly-owned, presently-pending application(s): application Ser. No. 10/209,283, filed Jul. 30, 2002, entitled "System and Methodology Providing Compiler-Assisted Refactoring". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size 17.2 KB, created Aug. 24, 2004, 5:02 pm; Object ID: File No. 1; Object Contents: Source Code.

BACKGROUND OF INVENTION

1. Field of the Invention

The present invention relates generally to a system providing methods for facilitating development and maintenance of software applications or systems, with particular emphasis on a system and methodology for asynchronous code refactoring.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks. While it is possible for humans to compose meaningful programs in machine code, practically all software development today employs one or more of the available programming languages. The most widely used programming languages are the "high-level" languages, such as C++, Pascal, or more recently Java® and C#. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program.

The ultimate output of the compiler is a compiled module such as a compiled C++"object module," which includes instructions for execution ultimately by a target processor, or a compiled Java® class, which includes bytecodes for execution ultimately by a Java® virtual machine. A Java® compiler generates platform-neutral "bytecodes"—an architecturally neutral, intermediate format designed for deploying application code efficiently to multiple platforms.

Integrated development environments, such as Borland's JBuilder®, Delphi (trademark) and C# Builder (trademark), are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, a debugger, and a compiler. In general operation, the user "paints" objects on one or more forms, using the form painter. Attributes and properties of the objects on the forms can be modified using the property manager or inspector. In conjunction with this operation, the user attaches or associates program code with particular objects on the screen (e.g., button object). Typically, code is generated by the IDE in response to user actions in the form painter and the user then manipulates the generated code using the editor. Changes made by the user to code in the editor are reflected in the form painter, and vice versa. After the program code has been developed, the compiler is used to generate binary code (e.g., Java® bytecode) for execution on a machine (e.g., a Java® virtual machine).

Although integrated development environments facilitate the development of applications, issues remain in the development and use of such applications. One problem is that when a large software program or application evolves over time it is common that the initial design gets lost as features that were not in the original specification are added to the application. One way of dealing with this problem of making changes is to design everything with the maximum amount of flexibility. However, this will often lead to unnecessary complexity in the software application, as it is unknown beforehand which parts of the application will require this additional flexibility. Irrespective of how well a system is initially designed or developed, the system is typically modified from time to time during its useful life to improve performance, to accommodate changing needs, to make the system easier to maintain, or for various other reasons.

"Refactoring" is a practice of making structured changes to software applications or systems which add the desired flexibility, but keep the functionality of the system the same. Refactoring involves taking small individual steps that are well defined and that can be applied in succession to yield more significant changes. For example, a developer may wish to perform a "rename refactoring" to change the name of a particular module (e.g., a class name in a Java® program). In order to make this change, the user must locate the definition of this class (i.e., the source code for the class)

as well as all uses of the class in other portions of the system. In the case of a class name in a Java® program, the class name is typically used not only for defining a variable, but also for constructing instances (or objects) of that class and accessing static members of the class (i.e., class variables). Another example of refactoring may involve moving a specified class to a new package (referred to as "move refactoring").

Refactoring of a system may be small or extensive, but even small changes can introduce errors or "defects" into the system. Accordingly, refactoring must be done correctly and completely in order to be effective. Good refactoring requires a mechanism for quickly and accurately identifying definitions and usage of a given symbol in a plurality of source files. The "symbols" that may be involved in refactoring include, for example, package names, class names, interfaces, methods, fields, variables, and properties. Identification of definitions and usage of a given symbol enables refactoring to be performed responsibly and durably so that no defects are introduced and no behavior is changed beyond the desired improvements in features, performance, and/or maintainability.

A particular problem in refactoring a complex application or system is that the application or system may be made up of a number of different modules that are separately developed. Conventionally, creation of a software application or system includes creation of individual source code modules. This approach simplifies program development by dividing functionality available in the program into separate source modules. It should be noted that for purposes of the following discussion the terms "source code" or "source" will refer to source code or any kind of intermediate language representation (IR) of a program. When multiple source modules are employed for creating a program, interdependencies between the individual modules often exist. Program logic in a first module can, for instance, reference variables, methods, objects, and symbols imported from a second module. By the very same token, the first module can also export its own methods, objects, and symbols, making them available for use by other modules. Because of interdependencies between modules, when a particular source module is refactored (e.g., by a developer), the developer must ensure that the modifications made during the refactoring are compatible with the other modules of the program. A particular concern is, therefore, that the changes made during the refactoring might "break" the system, because the change is incompatible with other, dependent modules of the system.

A common problem in the lifecycle of a software system is the ability to change application programming interfaces (APIs) in libraries. Any change of the API in a library which may result from changing source(s) of the library may result in errors in the parsing/attribution of the clients of this library (hereinafter "dependents"). This may limit or prevent the execution of traditional refactorings for the library. For example, a system may include both a library and a separate application module that uses (i.e., is dependent upon) the library. In this case the refactoring of the library may affect the application that is dependent upon the library. Generally, in this environment if refactoring occurs in one module (e.g., the library), then it must also be applied to the other module(s) that are dependent on it (e.g., the application module in this example).

Consider the same example of a library that has one or more applications dependent upon it. The library may, for example, be written and supplied by one company or organization and used by one or more other organizations in various applications. These applications that are written using the library are dependent upon the library. Accordingly, if the library is refactored, the dependent applications will be out of sync with the library and compilation errors may occur when they attempt to use the library. Unless the refactoring relates only to internal aspects of the library that are not used by any dependent applications, when the library is refactored, corresponding changes also need to be made to dependent applications.

The following discussion will use an example of one or more applications that are dependent upon a library. However, it should be noted this is only one example of items of software that are dependent upon one another. Other examples include, but are not limited to: a client portion of an application and a server portion of the application as well as a user interface (UI) portion of a system and a non-UI portion of the system. Various different source components of a software system (e.g., application) may be developed by different developers that may be geographically distributed in different parts of the world. When these components are integrated into a system they need to work with each other and changes made to one component may impact other components of the system.

This problem is typically addressed in one of the following ways in current systems. One approach is to manually refactor the source dependent module(s) to implement the same changes made to the refactored dependee module. For instance, in the case of a refactoring of a library on which an application is dependent, this would generally involve building the application against the refactored library to find compiler errors and then manually identifying and fixing all of these errors. Disadvantages of this approach include that this manual refactoring solution is both tedious and error prone. A developer has to find all the errors (e.g., by building the application against the library and finding compiler errors) and then manually fix them. He or she might miss some of the errors or may otherwise introduce incorrect behavior. In some cases the application may compile, even though underlying errors remain that were not addressed. Another problem is the possibility that new errors may be introduced during the manual fix-up process.

Another possible approach is to modify the library (dependee module) in such a way that the old behavior is maintained. For example, it may possible to do so by providing for duplication in the refactored library. This may involve retaining the existing functionality (before the refactoring) in the library so as to continue to provide support to any dependent modules (e.g., the application in this example). The new or additional functionality provided by the refactoring would then also be provided—for example with different names and with somewhat different behavior.

Another similar alternative is to provide an abstract layer between the application and the (newly refactored) library. The abstract layer can serve to forward the calls to the appropriate routines of the refactored library. However, this approach also adds considerable complexity to the library and may serve to make the refactoring impractical in many cases. Disadvantages of these approaches of supporting multiple interfaces or to retrofitting support for old versions into the newly refactored library include that they will cause the library to become more complex and, therefore, may also make it more fragile and susceptible to error. Use of either of these approaches also makes the library more difficult to design and implement and may take away many of the advantages of refactoring the library in the first place.

This is, in fact, another common alternative. In order to avoid these type of compatibility problems, users often simply elect not to perform any refactoring of the library (or other dependee module) in the first place. This avoids the above-described compatibility problems, but has the disadvantage of limiting the ability to implement needed changes.

What is needed is a solution that facilitates refactoring of a plurality of interdependent modules. The solution should enable refactorings of these modules to be performed even though the modules may be included in separate projects. The solution should also automate the refactoring process so as to improve productivity and reduce the possibility of error. Ideally, the solution should enable a first program or module to be refactored at one time and at a later date facilitate the application of the appropriate changes to a second module that is dependent upon the first one. The present invention provides a solution for these and other needs.

SUMMARY OF INVENTION

A system and methodology for asynchronous code refactoring with symbol injection is described. In one embodiment, for example, a method of the present invention is described for refactoring a plurality of interdependent software modules that reside in separate projects, the method comprises steps of: in response to a change that affects a particular symbol of a software module that resides in a first project, refactoring the software module of the first project to propagate the change to all instances of the particular symbol in the software module; during the refactoring of the software module of the first project, recording meta data about the refactoring that is required to effect the change; and automatically propagating the change to a dependent software module residing in a second project, by refactoring the dependent software module based on the recorded meta data about the refactoring that occurred to the software module of the first project.

In another embodiment, for example, a system of the present invention for automatically applying a refactoring to a second software module based on a refactoring of a first software module is described that comprises: a recording module for recording information about changes made to the first software module during a refactoring of the first software module; an injector module for copying symbol information about at least one symbol of the first software module into a symbol table for the second software module; and a refactoring module for automatically applying a refactoring to the second software module using the symbol table and the recorded information about changes made to the first software module.

In yet another embodiment, for example, a method of the present invention is described for asynchronous refactoring of a plurality of interdependent software programs, the method comprises steps of: refactoring a first software program so as to change symbols of the first software program; recording information about changes made to symbols of the first software program during the refactoring of the first software program; and subsequently, applying the refactoring to a second software program dependent upon the first software program by automatically propagating changes to symbols of the second software program based on the recorded information.

In another embodiment, for example, a method of the present invention is described for applying a refactoring to a plurality of software modules, the method comprises steps of: recording information about changes made to a first software module during a refactoring of the first software module; creating at least one symbol table entry based upon the recorded information about changes made to the first software module; injecting the at least one symbol table entry into a symbol table for a second software module; and refactoring the second software module using the symbol table and the recorded information about changes made to the first software module.

BRIEF DESCRIPTION OF DRAWINGS

FIG. 5B is a screenshot of the development or programming interface including a refactoring history window provided in the currently preferred embodiment of the present invention.

DETAILED DESCRIPTION

Glossary

Figure 1:
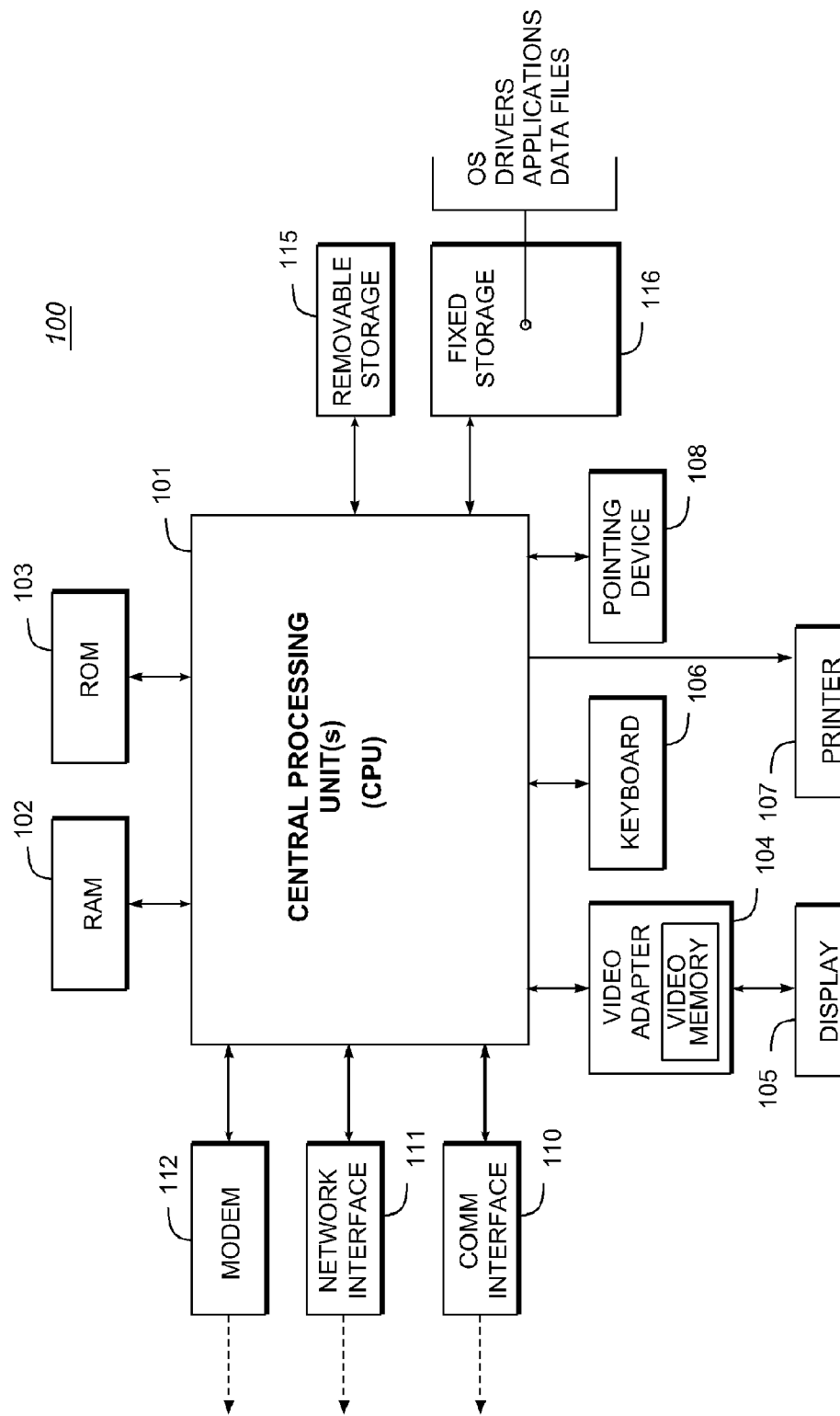
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java® virtual machine and the Microsoft .NET virtual machine provide a compiler to transform the respective source program (i.e., a Java® program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A "Java compiler" translates source code written in the Java® programming language into bytecode for the Java® virtual machine. For general background on the construction and operation of compilers, see e.g., Fischer et al., "Crafting a Compiler with C", Benjamin/Cummings Publishing Company, Inc., 1991, the disclosure of which is hereby incorporated by reference for purposes of illustrating the state of the art.

Java: Java® is a general purpose programming language developed by Sun Microsystems. Java® is an object-oriented language similar to C++, but simplified to eliminate language features that cause common programming errors. Java® source code files (files with a .java extension) are compiled into a format called bytecode (files with a .class extension), which can then be executed by a Java® interpreter. Compiled Java® code can run on most computers because Java® interpreters and runtime environments, known as Java® virtual machines (VMs), exist for most operating systems, including UNIX, the Macintosh OS, and Windows. Bytecode can also be converted directly into machine language instructions by a just-in-time (JIT) compiler. Further description of the Java® Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java® programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
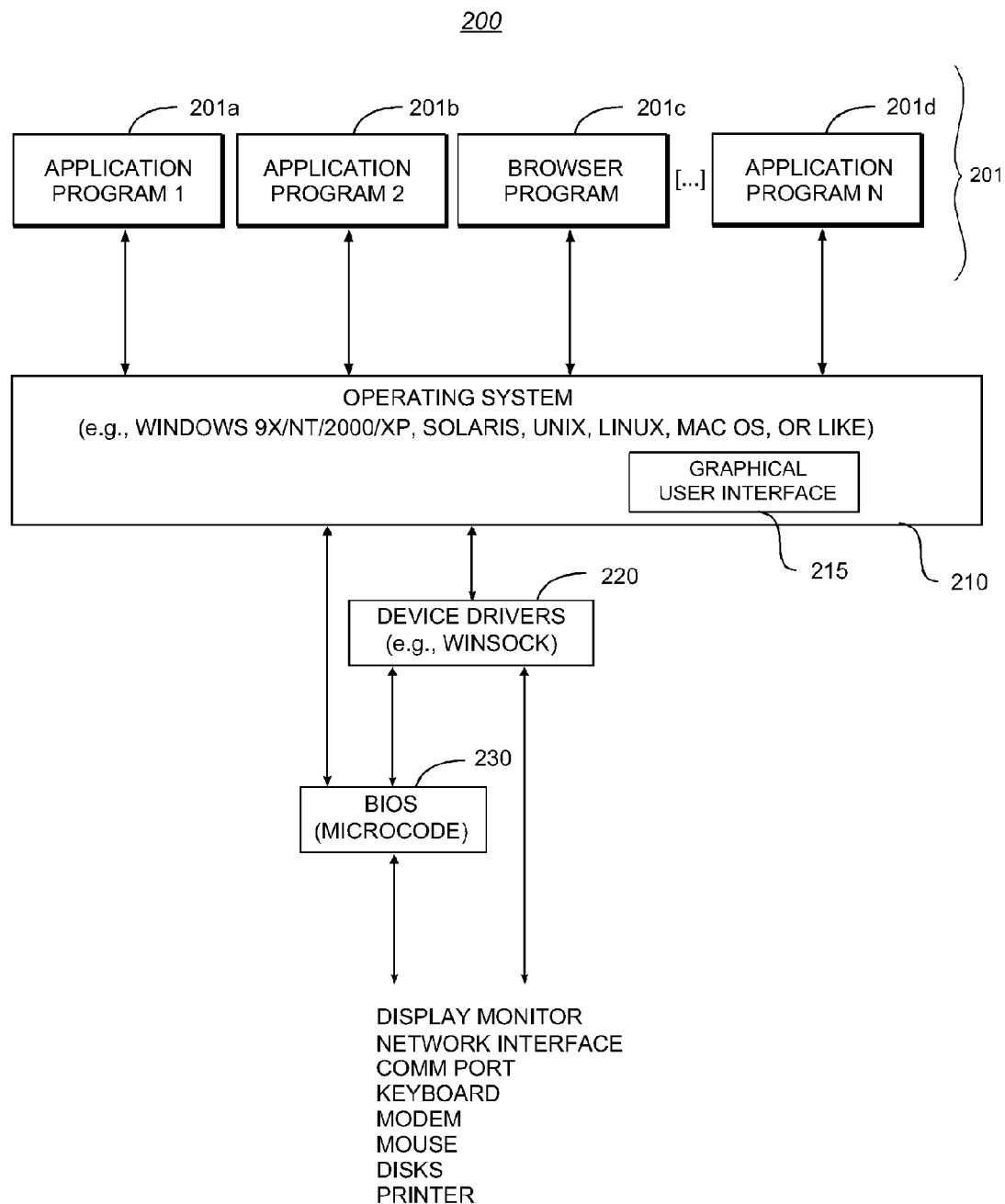
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Java® Development Environment

Java® is a simple, object-oriented language which supports multi-thread processing and garbage collection. Although the language is based on C++, a superset of C, it is much simpler. More importantly, Java® programs are "compiled" into a binary format that can be executed on many different platforms without recompilation. A typical Java® system comprises the following set of interrelated technologies: a language specification; a compiler for the Java® language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Figure 3A:
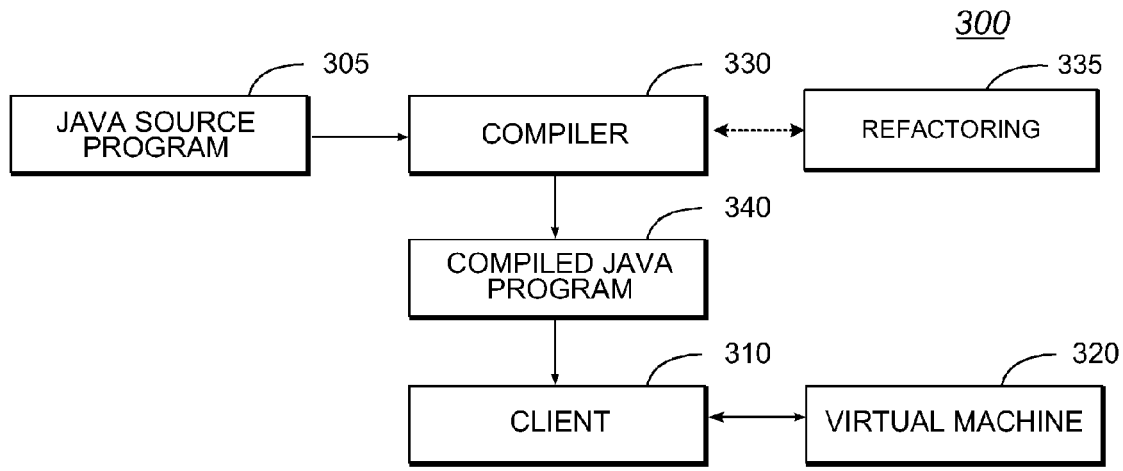
FIG. 3A is a block diagram of a Java® development system suitable for implementing the present invention.

FIG. 3A is a high-level block diagram illustrating a Java® development system 300 suitable for implementing the present invention. As shown, the Java® development system 300 includes a client 310 which employs a virtual machine 320 for executing programs. In particular, the client 310 executes a "compiled" (i.e., bytecode or pseudo-compiled) Java® program 340, which has been created by compiling a Java® source code program or script 305 with a Java® compiler 330. Here, the Java® source code program 305 is an application program written in the Java® programming language; the pseudo-compiled program 340, on the other hand, comprises the bytecode emitted by the compiler 330. The virtual machine 320 includes a runtime interpreter for interpreting the Java® bytecode program 340. During operation, the client 310 simply requests the virtual machine 320 to execute a particular Java® compiled program.

During development of a software program, a user typically edits source listings which are displayed in a text editor or similar editing surface of the development system. Specifically, "symbols" which comprise the source listings are displayed on the editing surface. The symbols are the basic constructs which are employed for developing software (e.g., application software). The source listings are then compiled into a software program, such as application or system software. Needless to say, a program of even modest complexity will have numerous symbols which somehow must be managed by the programmer. And for object-oriented programming systems in particular, the symbols will often comprise a complex hierarchy—one which may be conceptually difficult to visualize.

Compilation of source code typically involves several related operations. First, the input stream is scanned to break the source code files into a sequence of tokens or meaningful groups of characters. After scanning, the sequence of tokens is parsed to generate an abstract syntax tree or "parse tree" representation of the source code. Every programming language has a syntax—a set of grammar rules which specifies how statements and expression in that language are correctly written. A language's syntax dictates how compilers and interpreters translate programs. Knowledge about a source language's syntax is usually built into the "parser" of a compiler. The parser controls the translation process, since it analyzes the source program based on the syntax. The structure of a parser's routines is dictated largely from the syntax or formal grammar of the underlying language. The syntax describes how sentences can be formed in a general way. The parser's subroutines use the grammar to build the "parse tree" representation, which is a convenient way for a computer to represent the source listings.

The parsing process also generally includes resolution of symbol declarations as well as semantic analysis to verify the source code as a sequence of valid statements or expressions in the applicable programming language. The compiler also builds a symbol table and other supporting data structures for annotating each node in the parse tree with parse or type information. The output from these scanning and parsing operations is a parse tree in which nodes are annotated with either type or symbol information. Following these scanning and parsing operations, the annotated parse tree is usually optimized by a code optimizer to optimize data references globally within a program. After optimization, a code generator generates instructions or binary code for the target processor. Code generation may also include additional machine-dependent optimization of the program. Following compilation, the object code may also be "linked" or combined with runtime libraries (e.g., standard runtime library functions) to generate executable program(s), which may be executed by a target processor. The runtime libraries include previously compiled standard routines, such as graphics, input/output (I/O) routines, startup code, math libraries, and the like. The result of the above process is that the high level source code files have been translated into machine readable binary code which may then be executed.

For general background on the construction and operation of compilers, see e.g., Fischer et al., "Crafting a Compiler with C", Benjamin/Cummings Publishing Company, Inc., 1991, the disclosure of which is hereby incorporated by reference for purposes of illustrating the state of the art.

Also shown at FIG. 3A is the modification of the development system 300 to implement the present invention. As shown, a refactoring module 335 is provided for implementing the methodology of the present invention for asynchronous refactoring and symbol injection. The asynchronous refactoring operations of the system are described in detail below.

Figure 3B:
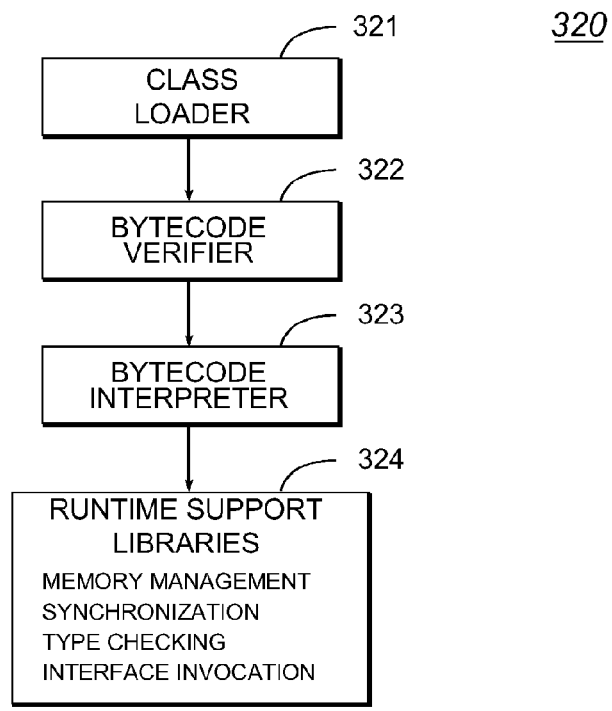
FIG. 3B is a block diagram illustrating the virtual machine of FIG. 3A in further detail.

FIG. 3B is a block diagram illustrating the virtual machine 320 of FIG. 3A in further detail. As shown in FIG. 3B, the virtual machine 320 comprises a class loader 321, a bytecode verifier 322, a bytecode interpreter 323, and runtime support libraries 324. The class loader 321 is responsible for unpacking the class file which has been requested by a client. Specifically, the class loader 321 will unpack different sections of a file and instantiate in-memory corresponding data structures. The class loader will invoke itself recursively for loading any superclasses of the current class which is being unpacked.

The bytecode verifier 322 verifies the bytecode as follows. First, it checks whether the class has the correct access level. Since the class will access other classes for invoking their methods, the bytecode verifier 322 must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These static variables comprise the variables which are present only once (i.e., only one instance), for all objects of the class.

Runtime support libraries 324 comprise functions (typically, written in C) which provide runtime support to the virtual machine, including memory management, synchronization, type checking, and interface invocation. At the client machine on which a Java® application is to be executed, runtime support libraries 324 are included as part of the virtual machine; the libraries are not included as part of the Java® application. The bytecode which is executed repeatedly calls into the runtime support libraries 324 for invoking various Java® runtime functions.

In the currently preferred embodiment, the Java® development system 300 may be provided by Borland® JBuilder® 10.0, available from Borland Software Corporation of Scotts Valley, Calif. Further description of the development system 300 may be found in "Building Applications with JBuilder (JBuilder 10)" (Part No. JXE0010WW21005bajb), also available from Borland Software Corporation, the disclosure of which is hereby incorporated by reference.

The above-described computer hardware and software are presented for purposes of illustrating the basic underlying desktop and server computer components that may be employed for implementing the present invention. For purposes of discussion, the following description will present examples in which it will be assumed that there exists at least one computer running applications developed using the Java® programming language. The present invention, however, is not limited to any particular environment or device configuration. In particular, use of the Java® programming language is not necessary to the invention, but is simply used to provide a framework for discussion. Instead, the present invention may be implemented in any type of system architecture or processing environment capable of supporting the methodologies of the present invention presented in detail below. The following description will focus on those features of the development system 300 which are helpful for understanding the methodology of the present invention for asynchronous refactoring.

Overview of System and Methodology for Asynchronous Refactoring

The present invention comprises a system providing methodology for performing an asynchronous refactoring of interdependent modules of a system. The present invention enables users to perform a refactoring of a first module (e.g., a library) at one point in time and to apply the same refactoring to another dependent module (e.g., an application dependent on the library) at a later time. The refactoring process is automated so as to avoid manually refactoring the dependent module, which can be tedious and error prone. The following discussion will use examples of one or more applications that are dependent upon a library for purposes of illustrating the operation of the present invention. However, as described above this is only one example of dependent modules with which the present invention may be utilized. Those skilled in the art will appreciate that the methodology of the present invention may be used with various different types of interdependent components including, for example, a client component of an application and a server component of an application or a user interface component of a system and a non-UI component of a system.

The general approach of the present invention for asynchronous refactoring of two (or more) dependent modules can be summarized as follows. When an original (or first) refactoring of a first (or "dependee") software module (e.g., a first software module or program which resides in a first project) is performed, meta information regarding the refactoring is recorded (e.g., tracked and persistently stored). The meta information that is recorded about the refactoring of the dependee includes, but is not limited to, any particular "symbol(s)" being affected by the refactoring and the specifics of the changes that are made. For purposes of this document, the term "symbol(s)" refers to any type of language symbol(s), including, but not limited to class symbols, method symbols, variable symbols, and function symbols (sometimes hereinafter referred to as ClassSymbol, MethodSymbol, VariableSymbol, FunctionSymbol, respectively). Subsequently, when one or more "dependent" module(s) are refactored (e.g., a second software module residing in a second project), the system of the present invention performs the refactoring based on the recorded meta information. This serves to apply the corresponding changes to the dependent module(s) necessary to maintain compatibility with the refactored dependee module.

The recorded refactoring meta information is applied to the dependent module(s) in two phases or sets of operations. In the first phase, entries for or more symbols are copied (or injected) into the symbol table (e.g., compiler symbol table) used for building the dependent module (e.g., application) based on the recorded refactoring meta information. In the second phase, the actual refactoring of the dependent module(s) is performed, using a conventional refactoring on the dependent module(s) that were fixed up in the first phase. Each of these phases are described below in greater detail.

In the first phase, all symbol(s) from the dependee affected by its refactoring are patched by removing and/or injecting necessary structures that allow parsing of the refactored symbols. The dependent application's source refers to "outdated" symbols that no longer exist in the dependee (i.e., because of refactoring of the dependee module). Accordingly, in this first phase a set of temporary symbols are created to temporarily represent the "outdated" symbols during the refactoring of the dependent application. For example, if a class has been renamed, symbol information regarding the outdated name of the class (i.e., the name before rename refactoring) is inserted in the correct namespace. Similarly, if a method has been removed (or added), or the method's signature has been changed during the refactoring of the dependee, the appropriate information is added or changed (as appropriate) so that the dependent sources can be parsed/attributed. It should be noted that the methodology of the present invention does not require actually patching all symbols to enable the dependent sources to be parsed without error. For instance, in a given situation there may be a number of refactorings to be applied and the present invention enables these refactorings to be performed one at a time. In some cases, such as the case involving the injection of a ClassSymbol, all symbol table entries for the affected class may be fixed up. However, if a program is refactored one method at a time, the present invention provides for injecting a symbol table entry for only the method that is being refactored.

In the second phase, the source(s) of the dependent application are parsed/attributed and a refactoring is automatically propagated (or applied) to the dependent based on the refactoring previously performed on the dependee. Existing tools and utilities may be used in the second phase to perform the actual refactoring of the dependent application (or module) based on the recorded information about the refactoring of the dependee. It should be noted that either the original refactoring of the dependee or any subsequent refactoring of dependent module(s) can performed using the compiler-assisted refactoring system and methodology described in commonly-owned, co-pending U.S. patent application Ser. No. 10/209,283 titled "System and Methodology Providing Compiler-Assisted Refactoring", the disclosure of which is hereby incorporated by reference. However, the use of this compiler-assisted refactoring system and methodology for performing these refactorings is not required, and these refactorings can also be performed using other refactoring tools and utilities. For example, other IDEs with refactoring support suitable for use in conjunction with the present invention include IntelliJ from JetBrains of Prague, Czech Republic, Eclipse available from the Eclipse Foundation (a non-profit, industry consortium), and Borland Delphi (trademark) from assignee Borland Software Corporation of Scotts Valley, Calif.

The following is a simple example illustrating this process. In a traditional refactoring, one starts with an existing program (e.g., a library) which may include several classes and methods. For example, the library may include a class "MyNamespace::OldClass". The refactoring of the library may involve a rename refactoring in which the name of this class is changed to "MyNamespace::NewClass". The methodology of the present invention provides that information about this refactoring is recorded (in any form). The recorded information includes that the class "MyNamespace::OldClass" has been renamed to "MyNamespace::NewClass".

If the above library is used by an application, the application may be affected by the refactoring of the library. For example, the application may include references to the "MyNamespace::OldClass" class of the library which need to be updated. The present invention provides for asynchronous refactoring of the application to maintain compatibility with the refactored library. When refactoring the application as part of this process, the application will likely not compile if run against the refactored library. The present invention provides for applying an asynchronous refactoring in this situation as described below.

In applying an asynchronous refactoring to the application, the class "MyNamespace::OldClass" is first injected in the classes symbol table used by the parser/attributor. In this fashion, the old version of the library is fixed up to facilitate the refactoring of the application that is dependent on the library. In this case, a symbol entry for "MyNamespace::OldClass" is temporarily inserted in the symbol table (e.g., the compiler symbol table) so that the application can be compiled and the refactoring can be performed in an automated fashion. The sources of the dependent application referring to "MyNamespace::OldClass" are then parsed and a conventional refactoring is applied to them, so that the class is renamed to "MyNamespace::NewClass".

The present invention is particularly useful in automating the process of resolving and fixing errors due to changes in library API(s). The solution takes the refactoring paradigm to a new level, providing a quick and easy way to react to changes in a library (or other dependee source(s)) on which a program is dependent. The present invention removes many of the error factors and frustrations which may arise when this process is performed manually. As a result, it can save developer time and effort in making changes during the lifecycle of a software project, thereby increasing productivity. The present invention is also particularly useful to distributors of libraries and other such programs as it allows these distributors to change the public API(s) to their programs while providing an automated way for their users to adapt to these changes.

System Components

Figure 4:
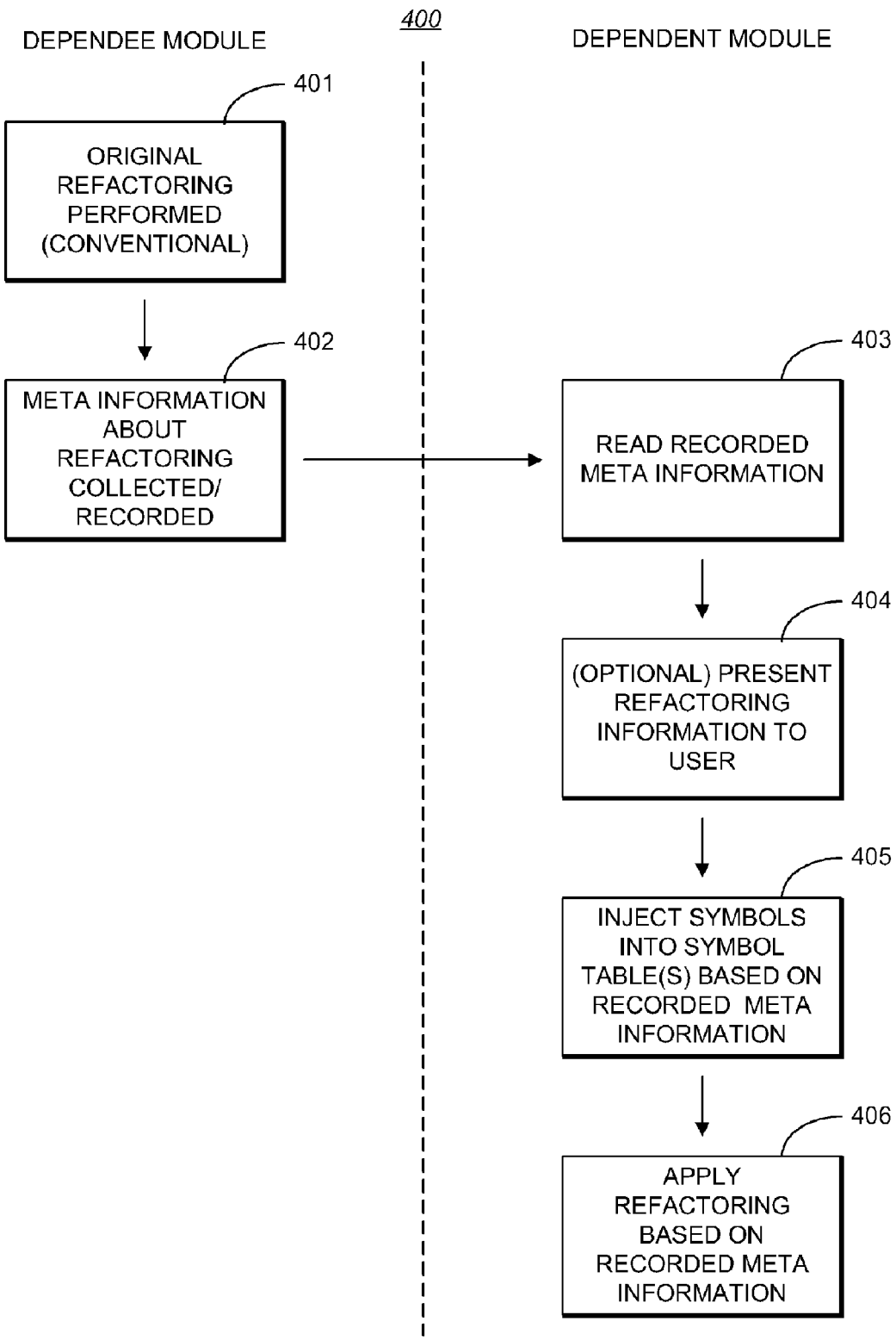
FIG. 4 is a high-level flow diagram illustrating the process of performing an asynchronous refactoring of two interdependent modules.

FIG. 4 is a high-level flow diagram 400 illustrating the process of performing an asynchronous refactoring of two interdependent modules. The present invention may be used for performing two (or more) separate refactorings of various modules that may have interdependencies. To illustrate the operations of the present invention, the following discussion describes the asynchronous refactoring of two modules: a dependee module (e.g., a library), and a single dependent module (e.g., an application dependent on the library). However, the system and methodology of the present invention may be used for performing a plurality of refactorings of various types of interdependent modules. The following discussion also uses some examples of the refactoring of a software application written in the Java programming language. However, the reference to Java is only to provide a framework for discussion and the system and methodology of the present invention may also be used for refactoring of software systems written in a variety of programming languages.

As shown, the process begins at 401 with the performance of a refactoring of a first or "dependee" module (e.g., a library). The module to be refactored may comprise one or more source files or listings. The source files may, for instance, comprise a particular software library that has been developed to perform particular tasks. The source files may have been developed using a visual development system such as Borland JBuilder (registered trademark) or Borland Delphi (trademark) (both available from assignee Borland Software Corporation of Scotts Valley, Calif.). Alternatively, the source files may be developed using a text editor or another type of development tool and compiled using a compiler. The refactoring itself that is performed at 401 may be performed using the compiler-assisted refactoring system and methodology referenced above. Alternatively, the refactoring may be performed using another refactoring tool or utility, as desired.

At 402, information about the refactoring of the library (dependee) is recorded. When the refactoring is performed (e.g., refactoring of the library using this example), meta information about the refactoring is collected. Typically, the collected information is written out and persisted (i.e., persistently stored) so that later this information can be used for a subsequent refactoring of a dependent module. However, the collected information could alternatively be streamed out to one or more dependent modules so that the refactoring of the dependent modules could occur almost in real time, if desired.

In the next stage, the collected information about the refactoring is used for performing a refactoring of another module (e.g., a dependent application). The system and methodology of the present invention enables a user to apply the same refactoring to the dependent application (module) using the collected information. This second refactoring is typically performed some period of time after completion of the initial refactoring. It should be noted that this second refactoring could be applied to another module running on the same machine at which the original refactoring was performed or on a different machine at a different location. Also, the dependent module (e.g., application) may be written using the same programming language or a different programming language than the dependee module (e.g., library).

At 403, the recorded meta information about the refactoring of the dependee module (e.g., the library) is read. Optionally, information about the refactoring may be presented to the user at 404. In the currently preferred embodiment of the present invention, a menu option is provided to present a list of refactorings that have been performed in dependee modules (e.g., in the library). Currently, a list of all of the refactorings that have been performed and those that have also been applied to the current module (e.g., the dependent application) is displayed. The user can then select a refactoring from the list of refactorings that have already been performed for refactoring of a dependent module. This menu option is provided in the system user interface for the convenience of users; however, it is not required for implementation of the present invention.

When a refactoring of the dependent module is initiated, the refactoring is performed in two general phases. First, entries for one or more symbol(s) are injected (i.e., copied) into the symbol table(s) (e.g., compiler symbol table) based upon the recorded meta information about the original refactoring at 405. In this example, entries for the symbol(s) are injected into the symbol table(s) used by the application based on the recorded information from the refactoring of the library. The recorded refactoring information is converted appropriately for the type of refactoring engine that is being used. For example, the refactoring could be performed with the assistance of the compiler or using another kind of refactoring engine or utility. Entries for the symbols are injected into appropriate tables so that it is possible to apply a normal refactoring. It should be noted that the injection of entries for symbols into a compiler symbol table is not required for implementation of the present invention. The symbols need to be recorded, tracked, and reused, but a different type of table can be used instead of a compiler symbol table.

In the currently preferred embodiment of the present invention, there are two different mechanisms provided for injection of symbols: one for directly injecting entries for symbols into symbol table(s) and a second for doing so in an indirect fashion. The indirect approach involves creating one or more "stub" source file(s) based on the collected refactoring information to represent the "outdated" version of the dependee module (e.g., the version of the library prior to the refactoring). When this "stub" source file(s) is parsed/attributed, entry(ies) for the symbol(s) are injected into the symbol table as a side effect. It should be noted that the symbol table entries as well as any stub source files that are created are only temporary and are removed when the refactoring is complete.

After the injection of symbol(s), the second phase of the refactoring process proceeds. The actual refactoring of the application (i.e., the dependent module) is then performed as illustrated at 406. The refactoring that is performed is a conventional refactoring that is performed based on the recorded refactoring information. The present invention, in its currently preferred embodiment, employs the compiler-assisted refactoring system and methodology described in commonly-owned, co-pending U.S. patent application Ser. No. 10/209,283 titled "System and Methodology Providing Compiler-Assisted Refactoring", above. However, another tool or utility may be used for performing the refactoring, as desired. When the refactoring is complete, the temporary symbol entries injected into the table(s) are removed and the process is complete.

As described above, the asynchronous refactoring methodology of the present invention involves several new steps or operations as compared to a conventional refactoring of a single module. These additional operations include collecting/recording meta information about the original refactoring, reading the recorded meta information (e.g., at a later time), and injecting entries for symbol(s) into symbol table(s) based on the recorded meta information. The original refactoring (e.g., of the library at step 401) is essentially conventional except for the addition of the recording of meta information about the refactoring. The last step (step 406) of refactoring the application uses the meta information about the original refactoring to ensure that the appropriate changes are applied to the dependent module. These operations are described below in more detail.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Recording and Reading Meta Information Regarding Original Refactoring

When a dependee module is refactored, information about this refactoring (original refactoring) is recorded so that it can later be applied to any dependent modules. For example, a rename refactoring of a library may include a class "MyNamespace::OldClass" as described above. The information that is recorded in this case will include that the "MyNamespace::OldClass" class has been renamed to "MyNamespace::NewClass".

The writing/recording of meta information and the reading back of this information are relatively straightforward. In the currently preferred embodiment of the present invention, meta information regarding the original refactoring that is performed is written into an XML format. XML is used as XML provides a language-independent way of representing information that can be used with Java as well as other programming languages. However, a different format can be used for writing (and reading) this meta information if desired. In the presently preferred embodiment, the document type definition (or "DTD") for reading and writing refactoring information is in XML format as follows:

```
 1: <?xml version="1.0" encoding="UTF-8" ?>
 2: <!ELEMENT refactor ((rename-package|change-method-
    signature|rename-method|rename-field|rename-class)*)>
 3:
 4: <!ELEMENT declaring-class-name (#PCDATA)>
 5:
 6: <!ELEMENT rename-method (declaring-class-name,
    declared-method-signature, old-method-name, new-
    method-name)>
 7: <!ATTLIST rename-method creation-time CDATA
    #REQUIRED>
 8: <!ATTLIST rename-method id CDATA #REQUIRED>
 9: <!ELEMENT declared-method-signature (#PCDATA)>
10: <!ELEMENT old-method-name (#PCDATA)>
11: <!ELEMENT new-method-name (#PCDATA)>
12:
13:
14: <!ELEMENT rename-class (old-class-name, new-class-
    name)>
15: <!ATTLIST rename-class creation-time CDATA
    #REQUIRED>
16: <!ATTLIST rename-class id CDATA #REQUIRED>
17: <!ELEMENT old-class-name (#PCDATA)>
18: <!ELEMENT new-class-name (#PCDATA)>
19:
20:
21: <!ELEMENT rename-package (old-package-name,
    new-package-name)>
22: <!ATTLIST rename-package creation-time CDATA
    #REQUIRED>
23: <!ATTLIST rename-package id CDATA #REQUIRED>
24: <!ELEMENT new-package-name (#PCDATA)>
25: <!ELEMENT old-package-name (#PCDATA)>
26:
27:
28: <!ELEMENT rename-field (declaring-class-name, old-
    field-name, declared-field-type, new-field-name)>
29: <!ATTLIST rename-field creation-time CDATA
    #REQUIRED>
30: <!ATTLIST rename-field id CDATA #REQUIRED>
31: <!ELEMENT old-field-name (#PCDATA)>
32: <!ELEMENT declared-field-type (#PCDATA)>
33: <!ELEMENT new-field-name (#PCDATA)>
34:
35:
36: <!ELEMENT change-method-signature (declaring-
    class-name, declared-method-name, old-method-signa-
    ture, new-return-type?, new-parameters?)>
37: <!ATTLIST change-method-signature creation-time
    CDATA #REQUIRED>
38: <!ATTLIST change-method-signature id CDATA
    #REQUIRED>
39: <!ELEMENT declared-method-name (#PCDATA)>
40: <!ELEMENT old-method-signature (#PCDATA)>
41: <!ELEMENT new-return-type (#PCDATA)>
42: <!ELEMENT new-parameters (parameter+)>
43: <!ELEMENT parameter (parameter-name, parameter-
    type, default-value?, old-index, new-index)>
44: <!ELEMENT parameter-name (#PCDATA)>
45: <!ELEMENT parameter-type (#PCDATA)>
46: <!ELEMENT default-value (#PCDATA)>
47: <!ELEMENT old-index (#PCDATA)>
48: <!ELEMENT new-index (#PCDATA)>
```

As shown above, a refactoring of a dependee module may include refactoring operations which would be of interest in the subsequent refactoring of one or more dependent module(s). These operations include: renaming a package, changing a method signature, renaming a method, renaming a field, and/or renaming a class. As described above, the methodology of the present invention provides for capturing certain information about the refactoring of the dependee module. The above DTD specifies the information that is captured. As shown, information about the dependee module before and after the refactoring are recorded. For instance, as illustrated at lines 14-18, when a class is renamed the old (i.e., outdated) class name prior to the refactoring and the new class name after the refactoring are collected. Information before and after the refactoring is collected so that this information can be subsequently used to perform a corresponding refactoring of a dependent module(s).

The captured information is then typically stored for later use. The captured information can be stored in any form, in any media, as desired. Alternatively, the information about the refactoring could be caught in real-time and streamed to others that would be interested in the original refactoring. In this respect it is not necessary that there be some lengthy delay or intervening period of time between the original refactoring (e.g., of the library) and the subsequent refactoring of the dependent modules (e.g., applications using the library). The information could be caught in real-time as the dependee was refactored and applied almost in real time through streaming to one or more dependent applications (modules).

Asynchronous Refactoring User Interface

Figure 5A:
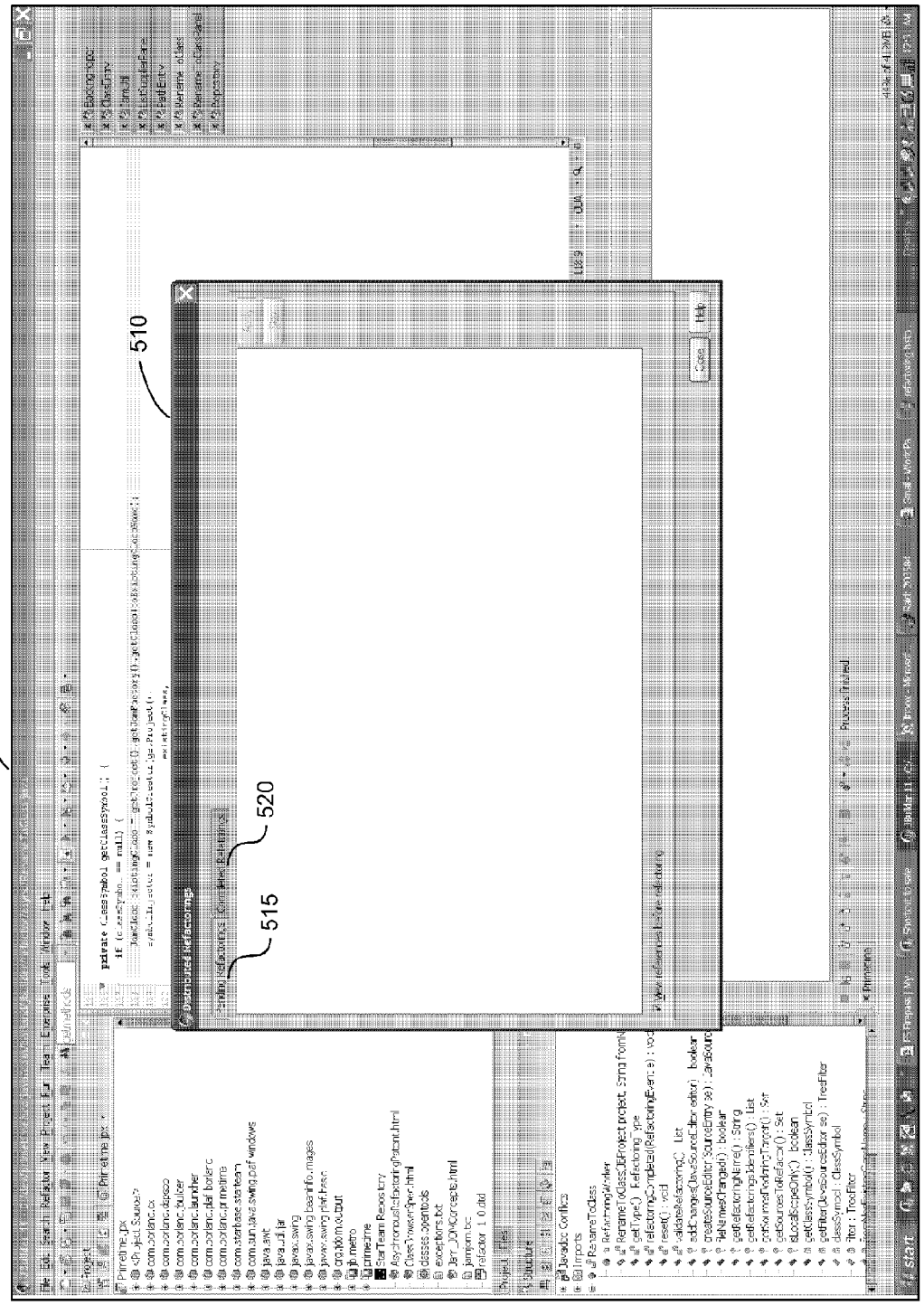
FIG. 5A is a screenshot of the development or programming interface including a distributed refactorings window provided in the currently preferred embodiment of the present invention.
Figure 5B:
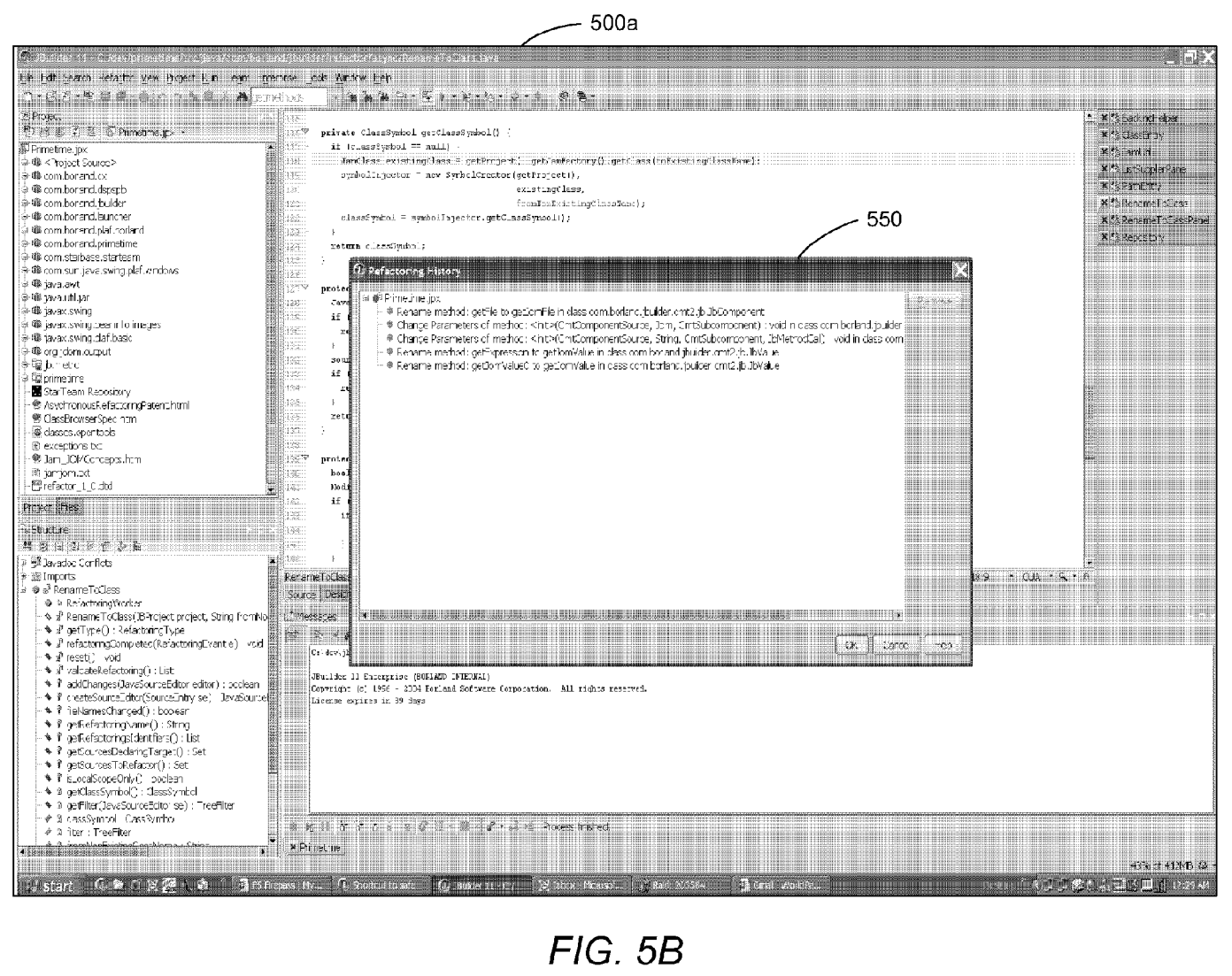

FIGS. 5A-B are screenshots of a preferred Java-based visual development or programming interface. FIG. 5A is a screenshot of a development or programming interface 500 including a distributed refactorings window 510 provided in the currently preferred embodiment of the present invention. As shown at FIG. 5A, the distributed refactorings window 510 includes two tabs: a pending refactorings tab 515 and a completed refactorings tab 520. The pending refactorings tab 515 provides for the display of a list of the refactorings that have occurred (e.g., in dependee modules). A user may consult the pending refactorings tab 515 to obtain a list of refactorings that have been discovered in projects (e.g., libraries) on which a given program or module is dependent and which should possibly be applied. (No pending refactorings are shown at FIG. 5A). It should be noted that the list of pending refactorings that is displayed typically will not include all refactorings that have been performed in dependee modules. There are some refactorings that only affect a single file and there is no need to capture or display information about that type of refactoring. For example, renaming a local variable that is not visible to a client (dependent) is generally not of interest and does not need to be captured or displayed. Other refactorings, however, may need to be distributed into other dependent modules in order to maintain compatibility.

In the presently preferred embodiment a dialog (not shown at FIG. 5A) allows a developer performing a refactoring to decide whether to keep the refactoring information and distribute it to others (i.e., for possible use in refactoring dependent modules). This dialog is provided as there are a number of circumstances in which a developer might not want to distribute information regarding a refactoring to others. For example, the developer may know that it is not possible for anyone to have used a particular module, so there is no need to capture information about refactoring the module. A method may, for instance, have been added in the current release of a library that has not yet been distributed to any users (e.g., applications using the library). In this case, if the new method is renamed (rename refactored), there is no need to capture/record information about the refactoring of the new module as no one was able to use it yet.

The completed refactorings tab 520 lists the refactorings that have previously been executed that were based on refactorings of the dependee files (library). The distributed refactorings window 510 enables a user (e.g., application developer) to track refactorings that may need to be performed as a result of dependencies on other modules and to determine the status of the effort to apply those refactorings to a given program (e.g., application).

FIG. 5B is another view of the development or programming interface 500a which now includes a refactoring history window 550 provided in the currently preferred embodiment of the present invention. The refactoring history window 550 displays information about refactorings that have been performed. The process of applying a refactoring that has been performed on a dependee software module to a dependent software module so as to maintain compatibility between two (or more) interdependent modules is described below in more detail.

Refactoring with Direct Injection of Symbols

As described above, refactorings of dependent modules are facilitated by injecting entries for symbol(s) into symbol table(s) enabling refactorings of these dependent modules to be performed in an automated fashion. There are two mechanisms for injection of symbols supported in the currently preferred embodiment of the present invention which are referred to as "direct" and "indirect" injections.

Figure 6:
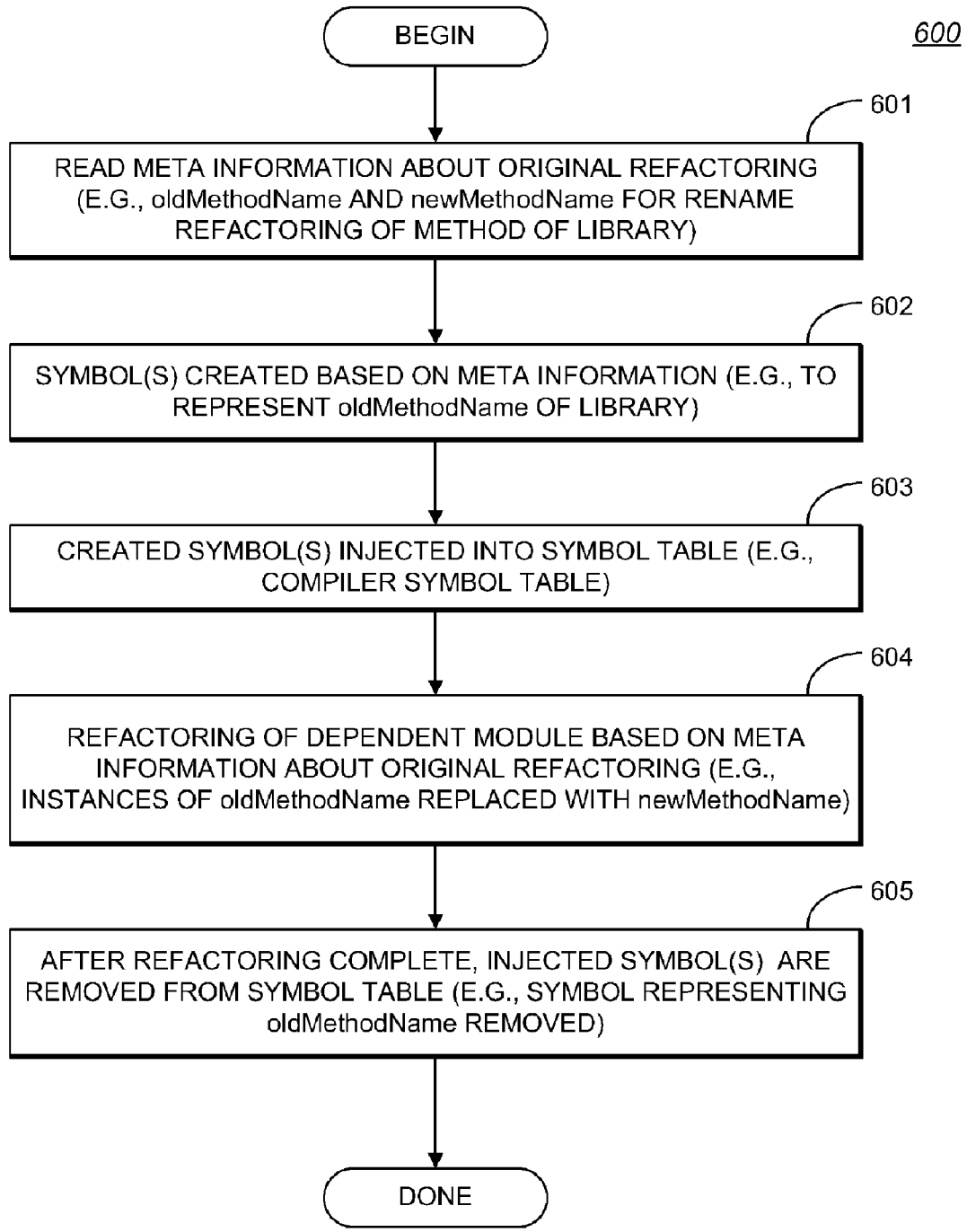
FIG. 6 is a flowchart illustrating the methodology of the present invention for refactoring of a dependent module with direct injection of one or more symbols into symbol tables.

FIG. 6 is a flowchart 600 illustrating the methodology of the present invention for refactoring of a dependent module with direct injection of entries for one or more symbols into symbol tables. The process starts with a given dependent module or application that is to be refactored based on a prior refactoring that has been performed. Assume that a refactoring has been performed that renamed a member (e.g., renamed a method) of a class of a library on which the application is dependent. For example, a method of the library may have changed its name from "oldMethodName" to "newMethodName". In order to apply the same refactoring to the application, the symbol injection methodology of the present invention essentially provides for "faking" the application (existing code) into thinking that the renamed member (i.e., oldMethodName) is still present in the library. In this case of renaming a method of a class, the class still exists in the library, but a class member (i.e., the oldMethodName method of the class) that may be used by the application no longer exists in the library as it has been renamed. The present invention provides for a symbol entry representing this class member (i.e., the oldMethodName) to be injected into the symbol table so that the rest of the application will think that it is present and will be able to use it in performing a refactoring of the application.

At step 601, the refactoring of the dependent module (e.g., application) commences with reading meta information about the original refactoring. In this case, this includes determining (looking up) the name of the method before the rename refactoring (oldMethodName) and after the rename refactoring (newMethodName) from the meta information about the refactoring of the library that has been previously captured. At step 602, symbol table entry(ies) are created based on the meta information. For instance, a symbol is created for the method with the name before the refactoring (e.g., the name oldMethodName that no longer actually exists in the library). At step 603, the created symbol(s) is injected (copied) into the symbol table (e.g., compiler symbol table). It should be noted that this symbol table entry is temporary and only exists in the symbol table for as long as needed to perform the refactoring of the application. It is removed after the refactoring is complete as provided below.

At step 604, the refactoring of the dependent module (e.g., application) is performed based on the meta information about the original refactoring. For instance, the refactoring of the application is performed in an automated fashion by replacing instances of oldMethodName with newMethodName. In the currently preferred embodiment, this refactoring is performed by the system with the assistance of the compiler (compiler-assisted refactoring). Every place that the oldMethodName is found by the complier in the application is identified and each such instance of oldMethodName is replaced correctly with the newMethodName. When this refactoring of the application is complete, the temporary symbol(s) injected at step 603 are removed from the symbol table at step 605. In this case, the symbol entry injected into the symbol table to represent the oldMethodName is removed from the symbol table.

The SymbolCreator class of the presently preferred embodiment that creates symbols for injection into symbol tables is as follows:

```
1:    package com.borland.jbuilder.refactor.async;
2:
3:    import com.borland.primetime.util.*;
4:
5:    import com.borland.jbuilder.jam.*;
6:    import com.borland.jbuilder.java.*;
7:    import com.borland.jbuilder.node.*;
8:
9:    import com.sun.tools.javac.code.*;
10:   import com.sun.tools.javac.code.Symbol.*;
11:
12:   public class SymbolCreator {
13:      private JBProject project;
14:      private ClassSymbol classSymbol;
15:
16:      private ClassCloner classCloner;
17:
18:      /**
19:       * Constructor when a class already exists. Will lookup the
20:       * classsymbol required for adding members
21:       *
22:       * @param project JBProject
23:       * @param existingClass JamClass
24:       */
25:      public SymbolCreator(JBProject project,
26:             JamClass existingClass) {
27:         this.project = project;
28:         classSymbol =
MemberInjector.findClassSymbol(existingClass.getName( ), project);
29:      }
30:
31:      /**
32:       * Constructor when the class does not exist and needs to be
33:       * created from a cloned class
34:       *
35:       * @param project JBProject
36:       * @param existingClass JamClass - this the class that will used
37:       * to clone the new class
38:       * @param newClass Name String - the name of the
new class once cloned
39:       */
40:      public SymbolCreator(JBProject project,
41:             JamClass existingClass,
42:             String newClassName) {
43:         this.project = project;
44:         classCloner = new ClassCloner(project, existingClass,
newClassName);
45:         classSymbol = classCloner.getNewClassSymbol( );
46:      }
47:
48:
49:
50:      public void clearSymbols( ) {
51:         if (classCloner != null) {
52:            classCloner.removeClonedClass( );
53:         }
54:         project.getCompilerManager( ).purgeCompilerContext( );
55:      }
56:
57:      /**
58:       * From method Name and methodType create a method symbol
for the
59:       * class passed in the contructor
60:       *
61:       * @param methodName String
62:       * @param methodTypeJamMethodType
63:       * @return MethodSymbol
64:       */
65:      public MethodSymbol addMethodSymbol(String methodName,
66:             JamMethodType methodType) {
67:         classSymbol = getClassSymbol( );
68:
69:         String[ ] parameters =
Jam Util.convertJamTypeToString(methodType.getParameters( ));
70:         String returnType = methodType.getReturnType( ).toText( );
71:         MethodSymbol newMethod =
MemberInjector.addMethodSymbol(classSymbol,
72:            Flags.PUBLIC,
73:            methodName,
74:            returnType,
75:            parameters,
76:            EmptyArrays.STRING_EMPTY_ARRAY,
77:            project);
78:         return newMethod;
79:      }
80:
81:      /**
82:       * From fromField Name and fieldType create a new
VarSymbol for
83:       * the class passed in the constructor
84:       *
85:       * @param fromField Name String
86:       * @param fieldType JamType
87:       * @return VarSymbol
88:       */
89:      public VarSymbol addFieldSymbol(String fromFieldName,
JamType fieldType) {
90:         classSymbol = getClassSymbol( );
91:
92:         VarSymbol newField;
93:         newField = MemberInjector.addFieldSymbol(classSymbol,
94:            Flags.PUBLIC,
95:            fromFieldName,
96:            fieldType.toText( ),
97:            project);
98:         return newField;
99:      }
100:
101:     /**
102:      * Get the class symbol found during construction of this class
103:      *
104:      * @return ClassSymbol
105:      */
106:     public ClassSymbol getClassSymbol( ) {
107:        return classSymbol;
108:     }
109:  }
```

The above SymbolCreator class includes two constructors. As shown at lines 25-29, a first constructor is used when a class already exists. This constructor looks up the ClassSymbol needed for adding members. The second constructor at lines 40-46 is used when the class does not exist and needs to be created from a cloned class. This constructor calls the ClassCloner (described below) to clone the class and gets the ClassSymbol as illustrated at lines 44-45.

As shown in the addMethodSymbol routine at lines 65-79, a method symbol is then created for the class passed into the constructor from the methodName and methodType. As shown, the addMethodSymbol routine of the MemberInjector class is then called to inject the symbol into the symbol table. The addFieldSymbol method at lines 89-99 creates a new VarSymbol for the class passed into the constructor based on the fromFieldName and fieldType. The addFieldSymbol method of the MemberInjector class is called to inject the symbol as shown at lines 93-97.

The MemberInjector class of the presently preferred embodiment that performs the direct injection of symbols is as follows:

```
1:    package com.borland.jbuilder.java;
2:
3:    import com.sun.tools.javac.code.Symbol.ClassSymbol;
4:    import com.sun.tools.javac.code.Symbol.VarSymbol;
5:    import com.sun.tools.javac.code.Symbol.MethodSymbol;
```

```
  6:    import com.borland.jbuilder.java.filter.FilterHelper;
  7:    import com.borland.primetime.node.Project;
  8:    import com.sun.tools.javac.jvm.ClassReader;
  9:    import com.sun.tools.javac.util.Name;
 10:    import com.sun.tools.javac.util.Name.Table;
 11:    import com.sun.tools.javac.comp.Check;
 12:    import com.sun.tools.javac.comp.Env;
 13:    import com.sun.tools.javac.util.*;
 14:    import com.sun.tools.javac.code.Type;
 15:    import com.sun.tools.javac.code.Symtab;
 16:    import com.borland.jbuilder.jam.JamMethodType;
 17:    import com.borland.jbuilder.jam.JamType;
 18:    import com.sun.tools.javac.code.Type.MethodType;
 19:    import com.borland.primetime.vfs.VFS;
 20:
 21:    public class Memberinjector {
 22:      /**
 23:       * Lookup for an existing ClassSymbol
 24:       * @param fullName String Full name of the class we are looking for.
 25:       * @param project Project Projecxt used for access to necessary context information.
 26:       * @return ClassSymbol The found ClassSymbol or null.
 27:       */
 28:      static public ClassSymbol findClassSymbol(String fullName, Project project) {
 29:        synchronized (CompilerManager.instance(project).getManager(true).
 30:            getContextLock( )) {// Alway get the JSp one (for now.)
 31:          return FilterHelper.lookupClass(fullName,
 32:            CompilerManager.instance(project).getManager(true).
 33:            getProjectContext( )); // Alway get the JSp one (for now.)
 34:        }
 35:      }
 36:
 37:      /**
 38:       * Removes a ClassSymbol from the ClassSymbol's table. (For cleanup purposes)
 39:       * @param fullName String Full name of the class to remove from the table
 40:       * @param project Project Project for access to necessary context information.
 41:       */
 42:      static public void removeClassSymbol(String fullName, Project project) {
 43:        synchronized (CompilerManager.instance(project).getManager(true).
 44:            getContextLock( )) {// Alway get the JSp one (for now.)
 45:          Name.Table names = Name.Table.instance(CompilerManager. instance(project).
 46:            getManager(true).getProjectContext( )); // Alway get the JSp one (for now.)
 47:          Name name = names.fromString(fullName);
 48:          ClassReader.instance(CompilerManager.instance(project).getManager(true).
 49:            getProjectContext( )).classes.remove(name); // Alway get the JSp one (for now.)
 50:          Check context =
    Check.instance(CompilerManager.instance(project).
 51:            getManager(true).getProjectContext( ));
 52:          context.compiled.remove(name); // Alway get the JSp one (for now.)
 53:        }
 54:      }
 55:
 56:      /**
 57:       * Lookup for a Field in an owner ClassSymbol.
 58:       * @param owner ClassSymbol
 59:       * @param name String name of the field
 60:       * @param project Project Project for access to necessary context information.
 61:       * @param env Env Used to get the Scope object on which to perform the lookup.
 62:       * @return VarSymbol The found field symbol or null.
 63:       */
 64:      static public VarSymbol find FieldSymbol(ClassSymbol owner, String name, Project project, Env env) {
 65:        try {
 66:          synchronized (CompilerManager.instance(project).getManager(true).
 67:            getContextLock( )) {// Alway get the JSp one (for now.)
 68:            Context context = CompilerManager.instance(project).getManager(true).
 69:              getProjectContext( ); // Alway get the JSp one (for now.)
 70:            ClassSymbol csym = FilterHelper.lookupClass(owner.flatName( ), context);
 71:
 72:            if (csym == null){
 73:              return null;
 74:            }
 75:
 76:            return FilterHelper.lookupVar(csym, name, context, env);
 77:          }
 78:        }
 79:        catch (Exception ex) {
 80:          return null;
 81:        }
 82:      }
 83:
 84:      /**
 85:       * Adds a field symbol to the "owner" ClassSymbol
 86:       * @param owner ClassSymbol The ClassSymbol to which to add the field symbol.
 87:       * @param flags long Modifiers of the field symbol
 88:       * @param varName String Name of the field symbol
 89:       * @param sType String Type of the field symbol
 90:       * @param project Project Project for access to necessary context information.
 91:       * @return VarSymbol The newly created field symbol
 92:       */
 93:      static public VarSymbol addFieldSymbol(ClassSymbol owner, long flags,
 94:                 String varName, String sType,
 95:                 Project project) {
 96:        assert owner != null;
 97:        try {
 98:          synchronized (CompilerManager.instance(project).getManager(true).
 99:            getContextLock( )) {// Alway get the JSp one (for now.)
100:            Type type = getTypeFromString(sType, project);
101:            assert type != null;
102:            VarSymbol ret = null;
103:            Name.Table names = Name.Table.instance(CompilerManager.instance(
104:              project).
105:              getManager(true).
106:              getProjectContext( )); // Alway get the JSp one (for now.)
107:            Name name = names.fromString(varName);
108:
109:            ret = new VarSymbol(flags, name, type, owner);
110:            owner.members( ).enter(ret);
111:            return ret;
112:          }
113:        }
114:        catch (Exception ex) {
115:          return null;
116:        }
117:      }
118:
119:      /**
120:       * Lookup for a method in an owner ClassSymbol.
121:       *
122:       * @param owner ClassSymbol
123:       * @param name String name of the method
124:       * @param retType String Return type of the method
125:       * @param parameterTypes String[ ] Parameter types fror the method
126:       * @param project Project Project for access to necessary context information.
127:       * @param env Env Used to get the Scope object on which to perform the lookup.
128:       * @return MethodSymbol The found method symbol or null.
129:       */
```

```
130:   static public MethodSymbol findMethodSymbol(ClassSymbol owner,
131:             String name, String retType,
132:             String[ ] parameterTypes,
133:             Project project, Env env) {
134:      assert owner != null;
135:      try{
136:         synchronized (CompilerManager.instance(project).getManager(true).
137:            getContextLock( )) {// Alway get the JSp one (for now.)
138:         Context context = CompilerManager.instance(project).getManager(true).
139:            getProjectContext( ); // Alway get the JSp one (for now.)
140:         JamType[ ] paramTypes = newJamType[parameterTypes. length];
141:         for (int i = 0; i < paramTypes.length; i++) {
142:            paramTypes[i] = JamType.fromText(parameterTypes[i]);
143:         }
144:
145:         String signature = Jam MethodType.createSignature(JamType.fromText(
146:            retType), paramTypes);
147:         MethodSymbol ret = FilterHelper.lookupFun(owner, name, signature,
148:            context, env);
149:         return ret;
150:       }
151:    }
152:    catch (Exception ex) {
153:      return null;
154:    }
155: }
156:
157: /**
158:  * Adds a method symbol to owner class symbol
159:  * @param owner ClassSymbol The ClassSymbol to which needs to add the new method symbol
160:  * @param flags long Modifiers of the new method symbol
161:  * @param method Name String Name of the new method symbol
162:  * @param retType String Return type of the new method symbol
163:  * @param parameterTypes String[ ] Parameter types for the new method symbol
164:  * @param thrownTypes String[ ] Exceptions thrown by the new method symbol
165:  * @param project Project Project for accessing necessary context information.
166:  * @return MethodSymbol The newly created MethodSymbol
167:  */
168: static public MethodSymbol addMethodSymbol(ClassSymbol owner, long flags,
169:             String method Name, String retType,
170:             String[ ] parameterTypes,
171:             String[ ] thrownTypes,
172:             Project project) {
173:    assert owner != null;
174:    try{
175:       synchronized (CompilerManager.instance(project).getManager(true).
176:          getContextLock( )) {// Alway get the JSp one (for now.)
177:       Type resType = getTypeFromString(retType, project);
178:       assert resType !=null;
179:       Context context = CompilerManager.instance(project).getManager(true).
180:          getProjectContext( ); // Alway get the JSp one (for now.)
181:       MethodSymbol ret = null;
182:       Name.Table names = Name.Table.instance(context);
183:       Name name = names.fromString(methodName);
184:
185:       ListBuffer paramTypes = new ListBuffer( );
186:       ListBuffer thrTypes = new ListBuffer( );
187:
188:       for (int i = 0; i < parameterTypes.length; i++) {
189:          paramTypes.append(getTypeFromString(parameterTypes[i], project));
190:       }
191:
192:       for (int i = 0; i < thrownTypes.length; i++) {
193:          thrTypes.append(getTypeFromString(thrownTypes[i], project));
194:       }
195:
196:       MethodType mType = new MethodType (paramTypes.toList( ), resType,
197:          thrTypes.toList( ), owner.type.tsym);
198:       ret = new MethodSymbol(flags, name, mType, owner);
199:       owner.members( ).enter(ret);
200:       return ret;
201:     }
202:  }
203:  catch (Exception ex) {
204:    return null;
205:  }
206: }
207:
208: /**
209:  * Converts a String represented parameter type to a compiler's Type.
210:  * @param sType String String represented type.
211:  * @param project Project Project used for access to necessary context information.
212:  * @return Type The converted compiler Type.
213:  */
214: private static Type getTypeFromString(String sType, Project project) {
215:    Type type = null;
216:
217:    Symtab syms = Symtab.instance(CompilerManager.instance(project).getManager(true).
       getProjectContext( )); // Alway get the JSp one (for now.)
218:
219:    if (sType.equals("int")) {// NORES
220:       type = syms.intType;
221:    }
222:    else if (sType.equals("byte")) {// NORES
223:       type = syms.byteType;
224:    }
225:    else if (sType.equals("char")) {// NORES
226:       type = syms.charType;
227:    }
228:    else if (sType.equals("short")) {// NORES
229:       type = syms.shortType;
230:    }
231:    else if (sType.equals("long")){// NORES
232:       type = syms.longType;
233:    }
234:    else if (sType.equals("float")) {// NORES
235:       type = syms.floatType;
236:    }
237:    else if (sType.equals("double")) {// NORES
238:       type = syms.doubleType;
239:    }
240:    else if (sType.equals("boolean")) {// NORES
241:       type = syms.booleanType;
242:    }
243:    else if (sType.equals("void")) {// NORES
244:       type = syms.voidType;
245:    }
246:    else if (sType.indexOf("[") != -1) {// NORES
247:       type = syms.arraysType;
248:    }
249:
250:    else {
251:       type = findClassSymbol(sType, project).type;
252:    }
253:
254:    return type;
255: }
256: }
```

Of particular interest, the addFieldSymbol method of the above MemberInjector class adds a field symbol to the "owner" ClassSymbol as provided at lines 93-117. The method returns a VarSymbol, which is the newly created field symbol. The MemberInjector class also includes an addMethodSymbol routine which performs a similar function for adding a method symbol to a given ClassSymbol. The addMethodSymbol routine is shown above at lines 168-206. The routine returns a newly created MethodSymbol.

Refactoring with Indirect Injection of Symbols

Figure 7:
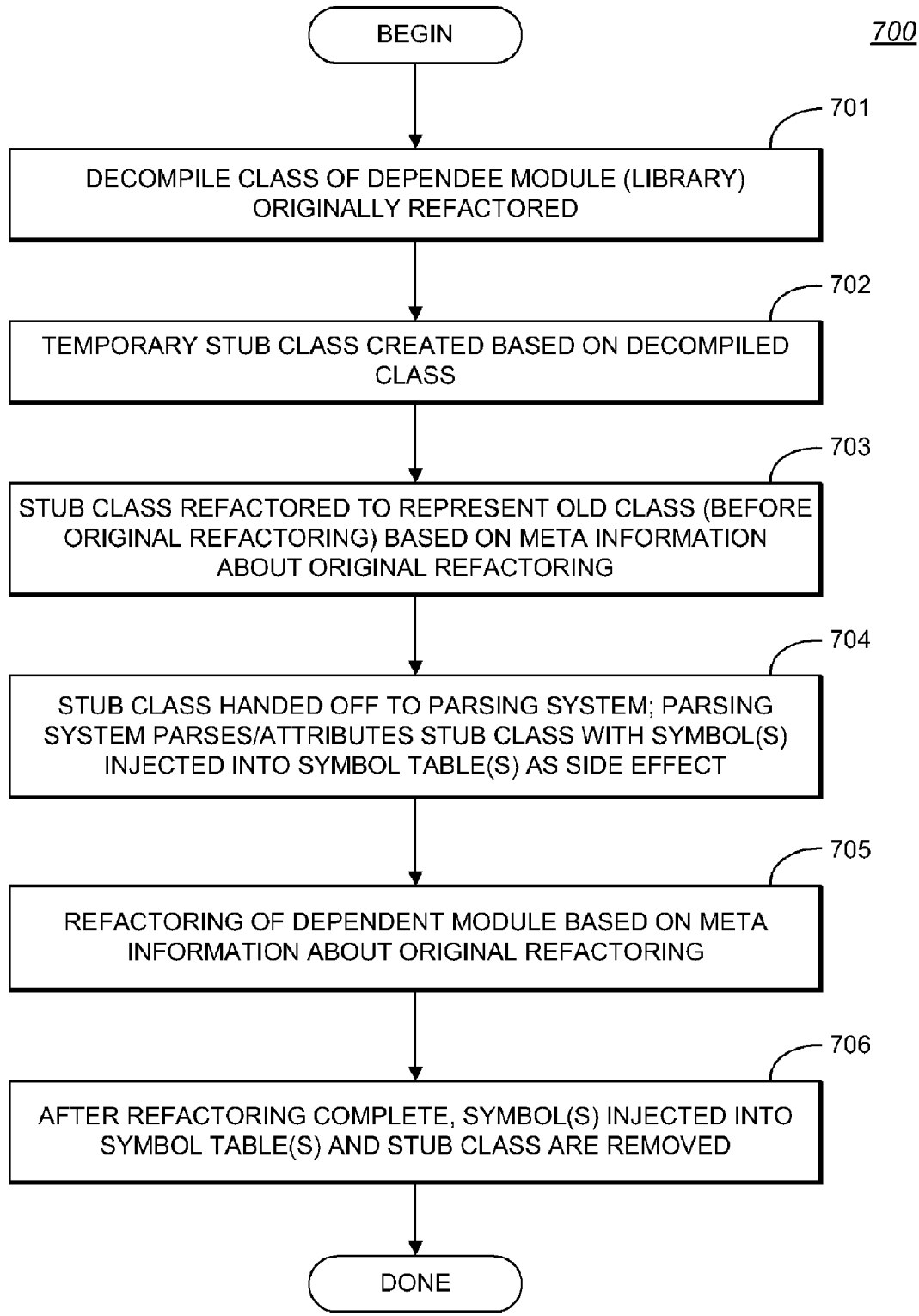
FIG. 7 is a flowchart illustrating the methodology of the present invention for refactoring of a dependent module with indirect injection of symbols into symbol tables.

FIG. 7 is a flowchart 700 illustrating the methodology of the present invention for refactoring of a dependent module with indirect injection of symbols into symbol tables. The indirect injection of symbol(s) is similar to direct injection. However, instead of creating a symbol table entry and directly injecting it into the symbol table(s), the symbols are injected indirectly by creating source code for the old version (i.e., the outdated version as in effect before the refactoring). When this source is parsed/attributed, the symbol table entries are then indirectly injected as a side effect.

At step 701, the process begins with decompiling the class of the dependee module (library) that was originally refactored. In the currently preferred embodiment, the new class of the dependee module (i.e., the class of the library after refactoring) is decompiled. At step 702, a temporary "stub" class is created based on the decompiled library class. The "stub" class that is created to represent this library class typically includes "stub" methods and "stub" fields. This stub class is created for the sake of the application "seeing" it. The source code of the stub class is then used to create the symbol table entries for the class and (indirectly) insert them into the symbol table.

At step 703, the stub class is then refactored to represent the old class (i.e., the outdated version of the class before the original refactoring of the library) based on the collected meta information about the original refactoring. In this manner the stub class is revised to include the old method names, field names, and so forth as were in effect before the refactoring. In other words, the stub class is fixed up so that it now represents the outdated version of the class (before the refactoring) that does not exist anymore. In effect, this recreates the old (outdated) version of the class for use in refactoring of the application.

After the stub class has been created and refactored it is handed off to the parsing system. At step 704, the parsing system parses/attributes the stub class and as a side effect the symbol(s) of the stub class are entered into the appropriate symbol table(s) as this parsing is performed. This serves to indirectly inject the symbol(s) into the symbol table(s). At step 705, the refactoring of the dependent module (application) is then performed based on meta information about original refactoring. This refactoring is performed in the same manner as described above. After the refactoring is completed, clean-up operations are performed at step 706. The clean up phase is similar to that described above. However, in this case both the temporary symbol(s) injected into the symbol table(s) and the stub class are removed after the refactoring is complete.

The ClassCloner class of the presently preferred embodiment that performs the indirect injection of symbols is as follows:

```
 1:   package com.borland.jbuilder.refactor.async;
 2:   import java.io.*;
 3:
 4:   import com.borland.primetime.vfs.*;
 5:
 6:   import com.borland.jbuilder.jam.*;
 7:   import com.borland.jbuilder.java.*;
 8:   import com.borland.jbuilder.jom.*;
 9:   import com.borland.jbuilder.node.*;
10:   import com.borland.jbuilder.repository.*;
11:
12:   import com.sun.tools.javac.code.*;
13:   import com.sun.tools.javac.code.Symbol.*;
14:
15:   public class ClassCloner {
16:     private JBProject project;
17:     private JomFile newClonedJomFile;
18:     private JamClass existingJamClass;
19:     private String newClass Name;
20:
21:
22:     /**
23:      * Will clone a class from existingJamClass and then rename the
24:      * package, class and constructors based on newClassName
25:      *
26:      * @param project JBProject
27:      * @param existingJamClass JamClass
28:      * @param newClass Name String
29:      */
30:     public ClassCloner(JBProject project, JamClass existingJamClass,
String newClassName) {
31:       this.project = project;
32:       this.existingJamClass = existingJamClass;
33:       this.newClassName = newClassName;
34:     }
35:
36:     /**
37:      * Clones the new class from existingJamClass and the
newClassName, parses
38:      * the newly create class which has the side affect of putting
it in the symbol
39:      * table and then returns the ClassSymbol from the symbol table
40:      *
41:      * @return ClassSymbol
42:      */
43:     public ClassSymbol getNewClassSymbol( ) {
44:       createNewClass( );
45:       return MemberInjector.findClassSymbol(newClassName,
project);
46:     }
47:
48:     private void createNewClass( ) {
49:       if (newClonedJomFile == null) {
50:         //Get an url for the new class from it's name and using the
projects paths
51:         Url newUrl = JomUtil.getUrlFromClassName(project,
newClass Name);
52:
53:         ClassEntry ce =
project.getRepository( ).getClassEntry(existingJamClass.getName( ));
54:         Url classFileUrl = ce.getFile( );
55:         //Will contain the source code for the existing class
(directly or decompiled)
56:       String newSource = null;
57:
58:         //Try to create by decompiling if the compiled class file
exists
59:         if (classFileUrl != null && VFS.exists(classFileUrl)) {
60:           ClassStubSource stub = null;
61:           stub = new ClassStubSource(classFileUrl);
62:           newSource = stub.toString( );
63:         }
64:         //Else copy the source content from the source file
65:         else {
66:           SourceEntry se = ce.getSource( );
67:           if (se != null) {
68:             try{
69:               newSource = new
String(VFS.getBuffer(se.getFile( )).getContent( ));
70:             }
71:             catch (IOException ex) {
72:             }
```

-continued

```
 73:         }
 74:      }
 75:      if (newSource == null) {
 76:         return;
 77:      }
 78:
 79:      //Create a SourceInfo for newSource and set to newUrl
 80:      SourceInfo si =
project.getSourceInfoManager( ).get(newSource);
 81:      si.setUrl(newUrl);
 82:
 83:      //Create an instance of JomFile so we can fix up the class and package
 84:      //names
 85:      newClonedJomFile = JomFile.instance(project, si, newUrl);
 86:      if (newClonedJomFile != null) {
 87:         JomClass jomClass =
newClonedJomFile.getClass(existingJamClass.getType( ));
 88:
 89:         if (jomClass != null) {
 90:            //Set's the new class name (will fix up the classname and constructors)
 91:
jomClass.setName(JavaNames.getClassName(newClassName));
 92:         }
 93:         String newPackageName =
JavaNames.getPackageName(newClassName);
 94:         String oldPackageName =
JavaNames.getPackageName(existingJamClass.getName( ));
 95:
 96:         //If the new class is in a different package than fix up the package statement
 97:         if (!newPackageName.equals(oldPackageName)) {
 98:
newClonedJomFile.getPackage( ).setPackageName(newPackageName);
 99:            newClonedJomFile.addImport(new
JomImport(oldPackageName + ".*"));
100:         }
101:         //Now commit changes which also enters the symbols into the symbol table
102:         //for the new class
103:         newClonedJomFile.commitAndEnterSymbols(false);
104:      }
105:   }
106: }
107:
108: /**
109:  * Removes the cloned class
110:  */
111: public void removeClonedClass( ) {
112:    try {
113:       if (newClonedJomFile != null) {
114:          VFS.delete(newClonedJomFile.getUrl( ));
115:          newClonedJomFile = null;
116:       }
117:    }
118:    catch (IOException ex) {
119:    }
120: }
121: }
```

The above routine clones an existing class of a program and then changes it to represent an outdated (or old) class as in effect prior to a refactoring. As illustrated above at line 44, a createNewClass method is called to create a clone based on an existing class. As described below, the createNewClass method clones an existing class (existingJamClass) and then fixes it up. The newly created class is then parsed which has the side effect of inserting symbols in the symbol table. The ClassSymbol is then returned from the symbol table through the call to the findClassSymbol method of MemberInjector as provided at line 45.

When the createNewClass method is called, it gets a URL for the new class from its name and using the project's paths as provided at line 51. The source (newSource) for the existing class is then obtained either directly or by decompiling the compiled class file. A SourceInfo is created for the newSource and set to the new URL as provided at lines 80-81. Next, an instance of JomFile is created to enable the class and package names of the cloned class to be fixed up. The name and constructors of the cloned class are fixed up as illustrated at lines 89-94. The package statement is also fixed up if the new class is in a different package as provided at lines 97-100. The call to the commitAndEnterSymbols method at line 103 commits the changes made to the cloned class which also enters the symbols into the symbol table.

Direct and Indirect Symbol Injection

It should be noted that in the currently preferred embodiment, both of the above approaches (direct and indirect injection) are typically used for refactoring of dependent modules. The following will described this in general terms using a typical example of a refactoring of a dependent module (e.g., application) based on an original refactoring of a class of dependee module (e.g., a library). In the case of refactoring of a dependent application based on an original refactoring of a class of the library, the general process is as follows. First, the original version of the library class is decompiled into source code as described above and a "stub" class is created to represent the old version of the class (before the refactoring) as illustrated in the above ClassCloner module. The source code for this stub class is then used as the basis for indirect injection of the symbols for the class into the symbol table(s). Next, with respect to members of the class (e.g., fields and methods of the class), the injector module (MemberInjector) is used for direct injection of those symbol(s). Thus, for a refactoring of the class both mechanisms for injecting the symbols are generally used in the currently preferred embodiment of the present invention.

While the invention is described in some detail with specific reference to a single-preferred embodiment and certain alternatives, there is no intent to limit the invention to that particular embodiment or those specific alternatives. For instance, use of the Java programming language is not necessary to the invention, and the present invention may be implemented in a variety of system architecture and processing environments. Those skilled in the art will appreciate that modifications may be made to the preferred embodiment without departing from the teachings of the present invention.

What is claimed is:

1. A method for refactoring a plurality of interdependent software modules that reside in separate projects, the method comprising:

in response to a change that affects a particular symbol of a software module that resides in a first project, refactoring the software module of the first project to propagate the change to all instances of the particular symbol in the software module;

during the refactoring of the software module of the first project at a given point in time, recording meta data about the refactoring that is required to effect the change; and at a subsequent point in time, automatically propagating the change to a dependent software module residing in a second project, by refactoring the dependent software module based on the recorded meta data about the refactoring that occurred to the software module of the first project; wherein the dependent software module is refactored with assistance of a symbol table used for resolving symbol references, and wherein said automatically propagating step includes: copying symbol information about the particular symbol used for the software module of the first project into the symbol table used for refactoring the dependent software module.

2. The method of claim 1, further comprising:
removing symbol information about the particular symbol used for the software module of the first project from the symbol table used for refactoring the dependent software module after the refactoring of the dependent software module.

3. The method of claim 1, wherein said copying symbol information step includes copying symbol information into a compiler symbol table used for refactoring the dependent software module.

4. The method of claim 1, wherein said copying symbol information step includes creating source code based on the recorded meta data.

5. The method of claim 4, further comprising:
parsing the source code so as to indirectly inject symbol information into the symbol table used for refactoring the dependent software module.

6. The method of claim 4, wherein said copying symbol information step includes indirectly injecting symbol information for a class into the symbol table by parsing the source code and directly injecting symbol information for members of the class into the symbol table.

7. The method of claim 4, further comprising:
deleting the source code after refactoring the dependent software module.

8. The method of claim 1, wherein the refactoring of the software module of the first project comprises a selected one of renaming a package, changing a method signature, renaming a method, renaming a field, and renaming a class.

9. The method of claim 1, wherein said automatically propagating step includes propagating changes to the dependent software module so as to maintain compatibility with the software module of the first project.

10. The method of claim 1, wherein said recording step includes recording meta data before and after refactoring of the software module of the first project.

11. The method of claim 1, wherein said recording step includes recording information in Extensible Markup Language (XML) format.

12. The method of claim 1, wherein the software module of the first project is in a first programming language and the dependent software module of the second project is in a second programming language.

13. A computer-readable medium having processor-executable instructions for performing the method of claim 1.

14. A downloadable set of processor-executable instructions for performing the method of claim 1.

15. A system for automatically applying a refactoring to a second software module based on a refactoring of a first software module, the system comprising:
a computer having a processor and memory;
a refactoring module for refactoring the first software module to propagate a change to all instances of a particular symbol in the first software module in response to the change that affects the particular symbol of the first software module;
a recording module for recording meta data about changes made to the first software module in a first project during the refactoring of the first software module at a given point in time;
an injector module for copying symbol information about the particular symbol of the first software module into a symbol table for the second software module in a second project; and
the refactoring module for automatically propagating the change to the second software module by applying a refactoring to the second software module at a subsequent point in time using said symbol table for the second software module and the recorded meta data about changes made to the first software module.

16. The system of claim 15, wherein the second software module is dependent upon the first software module.

17. The system of claim 16, wherein the refactoring module applies changes to the second software module so as to maintain compatibility of the second software module with the first software module.

18. The system of claim 15, wherein the refactoring of the first software module comprises a selected one of renaming a package, changing a method signature, renaming a method, renaming a field, and renaming a class.

19. The system of claim 15, wherein the injector module creates source code based on the first software module and the recorded information.

20. The system of claim 19, wherein said injector module decompiles at least a portion of the first software module for creating source code.

21. The system of claim 19, wherein the injector module parses the source code so as to indirectly inject symbol information into said symbol table.

22. The system of claim 15, wherein the injector module copies symbol information into a compiler symbol table used by the refactoring module in the refactoring of the second software module.

23. The system of claim 15, wherein the first software module comprises a library.

24. The system of claim 23, wherein the second software module comprises an application using the library.

25. The system of claim 15, wherein said recording module records information before and after refactoring of the first software module.

26. The system of claim 15, wherein said recording module records information in Extensible Markup Language (XML) format.

27. The system of claim 15, wherein the first software module runs on a first machine and the second software module runs on a second machine.

28. The system of claim 15, wherein the first software module is in a first programming language and the second software module is in a second programming language.

29. A method for asynchronous refactoring of a plurality of interdependent software programs, the method comprising:
refactoring a first software program residing in a first project so as to change symbols of the first software program;
recording information about changes made to symbols of the first software program during the refactoring of the first software program at a given point in time; and
at a subsequent point in time, applying the refactoring to a second software program in a second project which is dependent upon the first software program by automatically propagating changes to symbols of the second software program based on said recorded information; wherein the second software program is refactored with assistance of a symbol table used for resolving symbol references, and wherein said applying step includes:
copying information about at least one symbol used in the first software program into the symbol table used for refactoring the second software program.

30. The method of claim 29, further comprising:
removing said information about at least one symbol used in the first software program from the symbol table after applying the refactoring of the second software program.

31. The method of claim 29, wherein said symbol table comprises a compiler symbol table.

32. The method of claim 29, wherein said copying information step includes creating source code based on the recorded information and parsing the source code so as to indirectly inject symbol information into the symbol table used for refactoring the second software program.

33. The method of claim 32, wherein said copying information step includes indirectly injecting symbol information for a class into the symbol table by parsing the source code and directly injecting symbol information for members of the class into the symbol table.

34. The method of claim 29, wherein said applying step includes applying the refactoring with assistance of a compiler for identifying and changing symbols of the second software program.

35. The method of claim 29, wherein the refactoring of the first software program comprises a selected one of renaming a package, changing a method signature, renaming a method, renaming a field, and renaming a class.

36. The method of claim 29, wherein the first software program comprises a library.

37. The method of claim 36, wherein the second software program comprises an application using the library.

38. The method of claim 29, wherein said recording step includes recording information before and after refactoring of the first software program.

39. The method of claim 29, wherein said recording step includes recording information in Extensible Markup Language (XML) format.

40. A computer-readable medium having processor-executable instructions for performing the method of claim 29.

41. A downloadable set of processor-executable instructions for performing the method of claim 29.

42. A method for applying a refactoring to a plurality of software modules, the method comprising:
recording information about changes made to a first software module in a first project during a refactoring of the first software module at a given point in time;
at a subsequent point in time, refactoring a second software module in a second project by performing substeps of:
creating at least one symbol table entry based upon the recorded information about changes made to the first software module; wherein said creating substep includes creating source code based on the first software module and the recorded information;
injecting said at least one symbol table entry into a symbol table for a second software module; wherein said injecting substep includes indirectly injecting symbol table entries for a class into the symbol table by parsing the source code and directly injecting symbol table entries for members of the class into the symbol table; and
refactoring the second software module using said symbol table and the recorded information about changes made to the first software module.

43. The method of claim 42, wherein the second software module is dependent upon the first software module.

44. The method of claim 43, wherein said refactoring the second software module step includes applying changes to the second software module so as to maintain compatibility with the first software module.

45. The method of claim 42, wherein the refactoring of the first software module comprises a selected one of renaming a package, changing a method signature, renaming a method, renaming a field, and renaming a class.

46. The method of claim 42, wherein said substep of creating source code includes decompiling at least a portion of the first software module.

47. The method of claim 42, wherein said injecting substep includes parsing the source code so as to indirectly inject a symbol table entry into said symbol table.

48. The method of claim 42, further comprising:
removing said at least one symbol table entry from said symbol table after applying the refactoring to the second software module.

49. The method of claim 42, wherein said symbol table comprises a compiler symbol table.

50. The method of claim 42, wherein said recording step includes recording information before and after refactoring of the first software module.

51. The method of claim 42, wherein said recording step includes recording information in Extensible Markup Language (XML) format.

52. The method of claim 42, wherein the first software module runs on a first machine and the second software module runs on a second machine.

53. The method of claim 42, wherein the first software module is in a first programming language and the second software module is in a second programming language.

54. A computer-readable medium having processor-executable instructions for performing the method of claim 42.

55. A downloadable set of processor-executable instructions for performing the method of claim 42.

* * * * *